United States Patent [19]

Thomas et al.

[11] Patent Number: 4,745,136

[45] Date of Patent: May 17, 1988

[54] POLYURETHANES PREPARED FROM DISPERSIONS OR SOLUTIONS OF CHOLESTEROL OR CHOLESTANOL-CONTAINING POLYMERS IN A POLYOL

[75] Inventors: Oomman P. Thomas; Robert B. Turner, both of Lake Jackson, Tex.

[73] Assignee: The Dow Chemical Company, Midland, Mich.

[21] Appl. No.: 73,037

[22] Filed: Jul. 14, 1987

Related U.S. Application Data

[63] Continuation-in-part of Ser. No. 878,460, Jun. 25, 1986, abandoned.

[51] Int. Cl.$^4$ .............................................. C08G 18/14
[52] U.S. Cl. ................... 521/114; 521/128; 521/129; 521/130; 521/135; 521/137; 521/163; 521/164; 521/167; 524/186; 524/198; 524/212; 524/244; 525/127; 525/128; 525/130
[58] Field of Search ............... 521/114, 128, 129, 130, 521/135, 137, 163, 164, 167, 172, 173, 174, 176, 177; 524/198, 186, 212, 244, 251, 310, 261, 377, 269, 714, 762, 765, 773, 776; 525/127, 128, 130; 252/182

[56] References Cited

U.S. PATENT DOCUMENTS

3,872,050  3/1975  Benton et al. ..................... 524/774

FOREIGN PATENT DOCUMENTS

56-152830  11/1981  Japan .

OTHER PUBLICATIONS

Sato, *Porima Daijesuto*, vol. 37, No. 6, pp. 10–16, 1985.
Jadhav et al., "Liquid Crystalline Polyurethanes", Gordon Research Conference", Jul. 7, 1986.
Iimura et al., *Makromol. Chem.*, 182, pp. 2569–2575, 1981.
Tanaka et al., *Polym. Preprints, Japan*, 33(7), pp. 1647–1650, 1984.
Verbit et al., *Mol. Cryst. Liq. Cryst.*, 1975, 30, pp. 87–99, 1972.
Tanaka et al, *Kobunshi Ronbunshu*, 43, pp. 311–314, 1986.

*Primary Examiner*—Maurice J. Welsh

[57] ABSTRACT

A solution or colloidal dispersion of a polymer of an ethylenically unsaturated steroid derivative in an active hydrogen-containing compound is claimed. The polymer provides improved physical properties to a polyurethane made by reacting the solution or dispersion with an polyisocyanate.

24 Claims, No Drawings

POLYURETHANES PREPARED FROM DISPERSIONS OR SOLUTIONS OF CHOLESTEROL OR CHOLESTANOL-CONTAINING POLYMERS IN A POLYOL

CROSS-REFERENCE TO RELATED APPLICATION

This is a continuation-in-part of application Ser. No. 878,460, filed June 25, 1986 and now abandoned.

BACKGROUND OF THE INVENTION

This invention relates to polyurethane polymers prepared from active hydrogen-containing materials which contain dissolved or dispersed reinforcing polymers.

Various polymers are prepared from compounds and polymers which contain a plurality of active hydrogen atoms. Principal among these polymers are the polyurethanes and polyureas. In preparing these polymers, it is normally desirable to obtain the best possible physical properties. For example, when a flexible polymeric foam is prepared, it is often desirable to produce a foam which has good load-bearing, resiliency and tensile properties.

The materials most commonly used in preparing polyurethanes and/or polyureas are polyethers and polyesters which contain two or more active hydrogen-containing groups. Although excellent polymers, both cellular and noncellular, are produced therefrom, it is desirable in certain instances to further improve their properties. One known method of improving the properties of polyurethanes made from polyethers or polyesters is to employ a dispersion of polymer particles in a continuous polyether or polyester polyol phase. These so-called polymer polyols or copolymer polyols contain addition polymers, polyurea or polyurethane-urea particles, or other polymers dispersed in the polyol as a plurality of colloidal (10–1000 nm) particles. The dispersed particles have been shown to improve various properties of the resulting cellular polyurethane and/or polyurea, and often perform a cell-opening function in the production of polyurethane and/or polyurea foam.

However, even with the use of a polymer polyol, improvement in certain properties of the polyurethane and/or polyurea polymer is desired. In particular, it is desirable to provide a cellular polyurethane and/or polyurea having high load bearing. In addition, a foam having a high modulus as defined later is also desirable. Such foams are particularly suitable for automobile or other seating, in which the foam desirably feels soft as one sits on it, yet provides sufficient support for adequate comfort.

It would therefore be desirable to provide a polyurethane and/or polyurea polymer having improved physical properties and to provide an active hydrogen-containing composition which reacts with a polyisocyanate to produce a polyurethane and/or polyurea polymer having improved properties.

SUMMARY OF THE INVENTION

In one aspect, this invention is a solution or colloidal dispersion of a polymer of an ethylenically unsaturated steroid derivative in an active hydrogen-containing compound having an average of at least two isocyanate-reactive groups per molecule.

In another aspect, this invention is a polyurethane and/or polyurea polymer prepared by reacting the solution or dispersion of this invention with a polyisocyanate.

In another aspect, this invention is a polyurethane and/or polyurea foam containing a polymer of an ethylenically unsaturated steroid derivative.

In yet another aspect, this invention is a crosslinked, noncellular or microcellular polyurethane and/or polyurea polymer containing a polymer of an ethylenically unsaturated steroid derivative.

The inclusion of a solution or dispersion of a polymer of an ethylenically unsaturated steroid derivative in an active hydrogen-containing composition has surprisingly been found to yield significant and unexpected improvements in the physical properties of polyurethane and/or polyurea polymers prepared therefrom. In particular, cellular polyurethane and/or polyurea polymers made from these solutions have excellent firmness and often exhibit high moduli.

DETAILED DESCRIPTION OF THE INVENTION

In this invention, a polyol having dissolved or dispersed therein a polymer of an ethylenically unsaturated steroid derivative is reacted with a polyisocyanate to form a polyurethane and/or polyurea polymer. The term "polyol" is used herein to broadly include compounds having a plurality of isocyanate-reactive groups, including hydroxyl, primary or secondary amine, carboxylic acid or mercaptan groups.

The polymer is soluble or colloidally dispersable in the active hydrogen-containing compound, and contains a plurality of pendant steroid moieties attached to the backbone of the polymer. By colloidally dispersible, it is meant that the polymer can be dispersed in an active hydrogen-containing compound as a plurality of particles having an average diameter of about 10–1000 nm. Preferably, the polymer is soluble in the polyol, as soluble polymers have been found to provide more effective reinforcement.

The molecular weight of the polymer of the ethylenically unsaturated steroid derivative is not especially critical if it is soluble or colloidally dispersable in the active hydrogen-containing compound.

Suitable ethylenically unsaturated steroid derivatives include compounds containing polymerizable ethylenic unsaturation and a cyclopentanoperhydrophenanthrene moiety. Exemplary steroid derivatives include derivatives of cholesterol, cholestanol, doristerol, campesterol, $\beta$-sitosterol, stigmatserol, ergosterol, cycloartenol and the like which contain ethylenic unsaturation. Suitable steroid compounds which can be easily modified to impart ethylenic unsaturation are described on pp. 108–112 of Kelker and Hatz, *Handbook of Liquid Crystals*, Verlag Chemie, (1980). Of these, derivatives of cholesterol and cholestanol are preferred on the basis of cost and availability.

Suitable ethylenically unsaturated steroid derivatives can be prepared by reacting it with a compound having ethylenic unsaturation and a group which reacts with a hydroxyl group to form a bond to the oxygen atom, such as an unsaturated acid, an unsaturated acid chloride, unsaturated anhydride, unsaturated epoxide or unsaturated isocyanate. Alternatively, an unsaturated ester can by reacted with an ester of the corresponding steroid in a transesterification reaction to provide the unsaturated steroid derivative. Cholesterol and cholestanol derivatives can be represented by the structure

R—Y—A wherein A represents

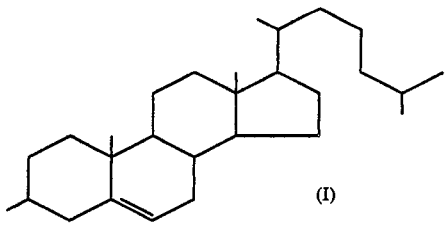

(I)

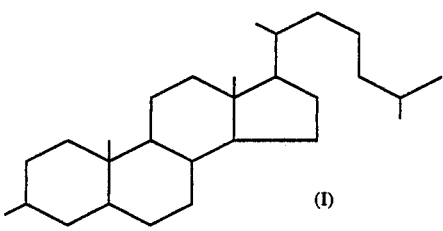

(I)

Y represents any linking group, advantageously —COO— or —NHCOO—, and R is an inertly substituted radical having polymerizable ethylenic unsaturation. In such derivatives, R is advantageously $CH_2=CH—$, $CH_2=C(CH_3)—$, trans-$CH_2CH=CH—$, $CH_2=CH(CH_2)_x—$ (wherein x is a number from about 1-10, preferably about 1-4), $CH_2=C(CH_3)COO(CH_2)_2—$, vinylbenzyl, vinylphenyl and the like, as well as a straight chain mono- or polyunsaturated hydrocarbyl group. Suitable such derivatives are described on Table 3, pages 116-117 of Blumstein, et al, "Liquid Crystalline Order in Polymers with Mesogenic Side Groups", *Liquid Crystalline Order in Polymers*, A. Blumstein, ed., Academic Press, Inc., New York (1978). Of these derivatives, the cholesterol derivative of isocyanatoethyl methacrylate (IEM) or other unsaturated isocyanate is preferred due to its availability and ease of manufacture.

A polymer containing pendant steroid groups can be prepared by a free-radical polymerization of the ethylenically unsaturated derivative. Suitable processes for the free-radical polymerization of ethylenically unsaturated monomers are well known in the art, and reference is made thereto for the purposes of this invention. The polymerization is conducted under conditions such that the resulting polymer is soluble or dispersible in an active hydrogen-containing compound or polymer.

Solution polymerization techniques are particularly suitable for polymerizing the ethylenically unsaturated monomer. In such solution polymerization, the monomer is polymerized in the presence of an inert solvent. By "inert" it is meant that the solvent does not react with the monomer, or otherwise undesirably interfere with the polymerization. When a solvent is used, it is advantageously stripped from the polymer after it is dissolved or dispersed in the active hydrogen-containing compound. Alternatively, the monomer can be polymerized in situ in the active hydrogen-containing compound or polymer. In such in situ polymerization, it is common practice to employ a dispersant to aid in the solubility or dispersability of the liquid crystalline polymer. Particularly suitable dispersants include adducts of the active hydrogen-containing compound and a difunctional compound having an active hydrogen-reactive group and an ethylenically unsaturated group, such as an ethylenically unsaturated isocyanate, carboxylic acid, carboxylic acid chloride, anhydride, epoxide and the like. Techniques for such in situ polymerization are taught, for example, in U.S. Pat. Nos. 4,460,715 and 4,394,491, incorporated by reference.

The polymerization is advantageously conducted in the presence of a source of free radicals. Any of the common free radical initiators such as the well known organic peroxides, peroxyesters and azo compounds are suitable for that purpose. In addition, radiation or other free radical sources can be used.

The polymerization is advantageously conducted at a temperature from about $-20°$ C. to about 150° C. The optimum polymerization temperature is, of course, dependent on the particular monomer used, the particular free radical initiator used, if any, and other circumstances which are well known in polymerizing ethylenically unsaturated monomers.

In order to control the molecular weight of the polymer, it may be advantageous to adjust the level of initiator used, or to employ a chain transfer agent in the polymerization. Typically, the use of a greater quantity of a free radical initiator or chain transfer agent tends to decrease the molecular weight of the resulting polymer. Thus, a free radical initiator is advantageously employed in an amount from about 0.01 to about 10, preferably about 0.05 to about 5 parts per 100 parts monomer. Suitable chain transfer agents include, for example, mercaptans, carboxylic acids, halogen containing compounds and the like. These and other suitable chain transfer agents are described, for example, in European Patent Publication No. 0091036A2.

The ethylenically unsaturated steroid derivative may be homopolymerized or copolymerized with another monomer. Any such copolymerization may be a random copolymerization, or a block or graft copolymerization. The sole limitation on such other monomer is that it must be of such composition and present in such an amount such that the steroid moieties in the polymer can aggregate to form a reinforcing structure. Advantageously, the ethylenically unsaturated steroid derivative comprises at least about 25, preferably from about 35 to about 100, more preferably from about 50 to about 100 mole percent of the monomers employed in its preparation are steroid derivatives.

Suitable comonomers include those described in U.S. Pat. No. 4,394,491, incorporated by reference. Of particular interest are the acrylic and methacrylic esters, particularly hydroxyalkyl acrylates and methacrylates; the unsaturated nitriles, particularly acrylonitrile; and the vinyl aromatics, particularly styrene.

The polymer of the ethylenically unsaturated steroid derivative is dissolved or dispersed in an active hydrogen-containing compound. The active hydrogen-containing compound can be of any composition as long as the polymer is soluble or dispersible therein at beneficial proportions. By "soluble or dispersible at beneficial proportions" it is meant that a sufficient amount the polymer can be dissolved or dispersed into the active hydrogen-containing compound to provide property or processing improvements to a polyurethane and/or polyurea polymer prepared therefrom. Typically, such improvement is seen when at least about 1, preferably about 1-80, more preferably about 3-60 parts by weight of a dispersed polymer are present per 100 parts of the active hydrogen-containing compound. When the polymer is dissolved in the active hydrogen-containing compound, preferably about 1-20, more preferably about 1-10 parts by weight are present per 100 parts of the active hydrogen-containing compound.

The active hydrogen-containing compound in which the polymer of the ethylenically unsaturated steroid derivative is dispersed is selected according to the properties which are desired in a polyurethane and/or polyurea polymer prepared therefrom. It is well known to employ various equivalent weight and functionality active hydrogen-containing compounds to produce polyurethane and/or polyurea polymers having various properties. For example, in the preparation of elastomeric polyurethanes and/or polyureas, relatively high equivalent weight (400-10,000) and low functionality (2-4 functional) active hydrogen-containing compounds are preferred. For making more rigid polyurethanes and/or polyureas, lower equivalent weight (31-1000), higher functionality (2-16 functional) materials are preferred. The selection of proper active hydrogen-containing compounds for use in preparing particular polyurethane and/or polyurea polymers is considered to be a matter of ordinary choice to one skilled in the art.

Suitable active hydrogen-containing compounds are described in U.S. Pat. No. 4,394,491, incorporated herein by reference. Preferred such compounds are polyether polyols and the corresponding amine-terminated polyethers; polyester polyols; the so-called polymer polyols, particularly those containing dispersed polymers of ethylenically unsaturated monomers, polyurea polymers or polyurethane-polyurea polymers; alkylene glycols and amine-terminated chain extenders as are described in U.S. Pat. No. 4,218,543. Most preferred are polyether polyols having a functionality of about 2-4 and an equivalent weight of about 800-3000, the corresponding amine-terminated polyethers, and copolymer polyols having dispersed polymers of ethylenically unsaturated monomers prepared from such polyether polyols as well as mixtures of these materials with alkylene glycols and/or amine-terminated chain extenders. It has surprisingly been found the the typical reinforcing effects of copolymers polyols are further increased with the use of a polymer of an ethylenically unsaturated steroid derivative.

The solution or dispersion of the polymer of an ethylenically unsaturated steroid derivative is formed into a polyurethane and/or polyurea polymer by reaction with a polyisocyanate. Procedures for conducting such reaction are well known and described, for example, by Ulrich, "Urethane Polymers", The Kirk-Othmer Encyclopedia of Chemical Technology, 3rd ed., Vol. 23 pp. 576-608 New York (1983).

Either aromatic or aliphatic organic polyisocyanates having an average of at least 2 isocyanate groups per molecule are useful. Such polyisocyanates are described, for example, in U.S. Pat. Nos. 4,065,410, 3,401,180, 3,454,606, 3,152,162, 3,492,330, 3,001,973, 3,594,164, and 3,164,605, all incorporated by reference.

Aromatic polyisocyanates which are particularly useful herein include 2,4- and/or 2,6-toluene diisocyanate, diphenylmethanediisocyanate, p-phenylene diisocyanate, polymethylenepolyphenylpolyisocyanates, mixtures thereof and the like. Also useful are polymeric derivatives of diphenylmethanediisocyanate as well as prepolymers or quasi-prepolymers thereof.

Particularly useful aliphatic polyisocyanates include, for example, the hydrogenated derivatives of the foregoing aromatic polyisocyanates, as well as hexamethylene diisocyanate, isophoronediisocyanate, 1,4-cyclohexane diisocyanate and the like.

In addition, prepolymers and quasi-prepolymers of the foregoing polyisocyanates having an —NCO content of about 0.5 to about 30% by weight are useful herein.

The polyisocyanate is advantageously present in an amount sufficient to provide in the reaction mixture from about 70 to about 500, preferably about 80 to about 150, and more preferably about 95 to about 120 isocyanate groups per 100 active hydrogen-containing groups. Greater amounts of the polyisocyanate can be used when the formation of an isocyanurate-containing polymer is desired.

In general, noncellular polyurethane and/or polyurea elastomers (those having an unfilled density of at least about 0.8 g/cc) are prepared by reacting a relatively high equivalent weight active hydrogen-containing compound (preferably 800-3000 molecular weight) and a chain extender compound with a polyisocyanate. The chain extender compound advantageously has an equivalent weight of from about 31-250 and a functionality of about 2-4, preferably about 2. The chain extender is preferably a glycol or a diamine, with $C_2$-$C_6$ alkylene glycols and stearically hindered aromatic diamines being preferred. In preparing noncellular or microcellular elastomers, a conventional casting process, particularly a solventless casting process, or a reaction injection molding process can be employed. Suitable casting techniques are described, for example, in U.S. Pat. No. 4,556,703. Reaction injection molding techniques are described, for example, in Sweeney, F. M., Introduction to Reaction Injection Molding, Technomics, Inc., 1979, incorporated by reference. Suitable formulations for use in RIM processes are described, for example, in U.S. Pat. Nos. 4,269,945, 4,218,610, 4,297,444, 4,530,941, all incorporated by reference. In these formulations, substitution of all or a portion of one or more of the active hydrogen-containing compounds with a solution or dispersion of this invention having a similar equivalent weight, functionality and reactivity is advantageously made.

In preparing elastomeric polyurethane and/or polyurea polymers, either a one-shot or two-shot (i.e. prepolymer) process can be employed. In the two-shot process, all or most of the relatively high equivalent weight active hydrogen-containing compound is reacted with an excess of a polyisocyanate to form an isocyanate-terminated prepolymer, which is then reacted with the chain extender and any remaining high equivalent weight material. In the on-shot process, most or all of the relatively high equivalent weight material is mixed with the chain extender and the mixture is reacted with the polyisocyanate. However, certain prepolyers and quasi-prepolymers may be employed as the polyisocyanate component even in a one-shot process.

Preferably, the polyurethane and/or polyurea polymer is cellular, i.e. has an unfilled density of less than about 0.8 g/cc. More preferably, the polyurethane and/or polyurea is a flexible polyurethane foam. Such flexible polyurethane foam is advantageously prepared by reacting a relatively high equivalent weight solution or dispersion of this invention with a polyisocyanate in the presence of a blowing agent. In preparing flexible polyurethane foams, it is advantageous to also employ a surfactant to stabilize the foaming reaction mass and to compatibilize the various components of the reaction mixture, and to employ various catalysts for both the urethane forming and blowing reactions. In addition, a crosslinker such as diethanolamine is often employed to promote rapid initial curing.

In preparing flexible polyurethane foam, the polyol used in making the solution or dispersion of this invention advantageously has an equivalent weight of about 800–3000 and an average functionality (defined herein as the number of active hydrogen-containing groups per molecule) from about 2 to about 4, more preferably about 2–3.

Suitable blowing agents for preparing foams are well known and include, for example, water, low boiling halogenated alkanes such as methylene chloride, monochlorodifluoromethane, dichlorodifluoromethane, dichloromonofluoromethane and the like, the so-called "azo" blowing agents, finely divided solids and the like as well as other materials which generate a gas under the conditions of the foaming reaction. Water, the halogenated methanes or mixtures thereof are preferred. When water is used as the blowing agent, about 0.5 to about 10, preferably about 1 to about 5 parts by weight are used per 100 parts of active hydrogen-containing compound(s). The halogenated alkanes are typically used in an amount from about 5 to about 75 parts per 100 parts by weight of active hydrogen-containing compound(s). However, the use of varying amounts of blowing agents to achieve a desired density is well known in the art, and it may in some instances be advantageous to use amount of blowing agents outside of the ranges mentioned before.

Suitable surfactants include the diverse silicone surfactants, preferably those which are block copolymers of a polysiloxane and a poly(alkylene oxide). Suitable such surfactants include Y-10184 surfactant, available from Union Carbide Corporation, and the like. Surfactants are used in an amount sufficient to stabilize the foaming reaction mixture against collapse until the foam is cured, and to promote the formation of a somewhat uniform cell structure. Typically, about 0.1 to about 5, preferably about 0.3 to about 3 parts by weight of surfactant are employed per 100 parts of active hydrogen-containing compound(s).

Crosslinkers which are commonly employed in preparing flexible polyurethane foams include low equivalent weight alkanolamines such as ethanolamine, diethanolamine, triethanolamine, propanolamine, dipropanolamine, tripropanol amine, methyldiethanol amine, methyl dipropanol amine, and the like. Also useful are the alkylene glycols and low equivalent weight hydroxyl-terminated polyols such as glycerine and trimethylolpropane. Such crosslinkers are generally used in minor amounts, preferably about 0.2 to about 10, more preferably about 0.5–5 parts per 100 parts of relatively high equivalent weight active hydrogen-containing compounds. Catalysts for preparing polyurethane and/or polyurea foams include organometallic catalysts and tertiary amine compounds. Of the organometallic catalysts, organotin catalysts are generally preferred. Suitable catalysts are described, for example, in U.S. Pat. No. 4,495,081, incorporated herein by reference. When using such catalysts, an amount sufficient to increase the rate of the urethane-forming (and foaming reactions, when a cellular polymer is formed) is used. Typically, about 0.001 to about 0.5 part of an organometallic catalyst is used per 100 parts of active hydrogen-containing compound(s). Tertiary amine-containing compounds are used in amount ranging form about 0.1 to abut 3 parts per 100 parts of active hydrogen-containing material. When polyisocyanurate foams are produced, alkali metal compounds are usefully employed as trimerization catalysts.

The foam can be prepared in any convenient manner. The foam can be prepared by reacting the components in a closed mold, or by permitting the reacting components to freely rise. Processes for preparing polyurethane foams are described, for example, in U.S. Pat. No. 4,451,588, incorporated by reference.

In addition to preparing flexible foams and noncellular elastomers, the solution or dispersion of this invention is useful in preparing rigid cellular and noncellular polyurethane and/or polyurea polymers. Methods for making such materials are described, for example, in U.S. Pat. Nos. 4,579,844 and 4,569,951, incorporated herein by reference. Rigid polyurethane foams are advantageously prepared using an active hydrogen-containing compounds having an equivalent weight from about 31–400 and an average functionality of about 3–16, preferably about 3 to about 8. The polyurethane and/or polyurea polymers of this invention are useful, for example, as seating, cushioning, industrial elastomers, automobile fascia and bumpers, thermal insulation and the like.

The following examples are provided to illustrate the invention, but are not intended to limit the scope thereof. All parts and percentages are by weight unless otherwise indicated.

EXAMPLE 1

A. Preparation of unsaturated cholesterolic monomer

In a suitable reactor, 78 grams (0.2 mole) of cholesterol are dissolved in 600 milliliters of freshly distilled toluene. To this solution is added 0.3 ml of an organotin catalyst (T-9, sold by Air Products and Chemicals, Inc.). While stirring at room temperature, a solution of 32 grams of isocyanatoethylmethacrylate (IEM) in 40 ml of toluene is added drop-wise. After all the IEM solution is added, the temperature is raised to 62° C. for two hours. The resulting monomer crystallizes out on cooling. The crystallized monomer is recovered and dried under vacuum at 100° C. for 24 hours. The resulting monomer, which has a melting point of 159° C., has the following structure:

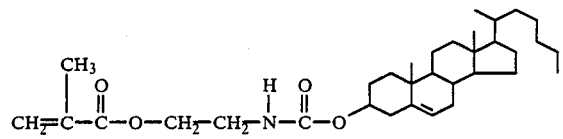

A 2-gram portion of the monomer is dispersed in 20 ml toluene and placed in a 100 ml flask under a nitrogen pad. To this mixture is added 0.04 g (0.02% by weight based on monomer) of azobis(isobutyronitrile). The temperature of the flask is raised to 67° C. for a period of four hours to effect polymerization. The flask is then cooled and the product polymer is precipitated in methanol, filtered and dried.

The dried polymer is examined on a Zeiss universal polarizing-light microscope equipped with a Mettler FP-82 hot stage. A phase change is seen at 240° C. above which the polymer appears as a birefringent fluid. A bluish phase characteristic of the cholesteric liquid crystalline state is observed at 257° C. under crossed polars. From this observation, it is concluded that the polymer is liquid crystalline.

B. Preparation of Dispersion In Polyol

Under nitrogen in a suitable reactor are mixed 23 grams of the monomer from part A and 295 grams of a 1650 equivalent weight ethylene oxide-capped poly(propylene oxide) (Polyol A). After thorough mixing, the temperature of the mixture is raised to 125° C. Separately, 150 grams of an IEM capped polyol is prepared by reacting IEM with Polyol A at a mole ratio of 0.374. Into the capped polyol is dissolved 0.6 gram of azobis(isobutyronitrile). The resulting solution is slowly added to the reactor over a one-hour period at a temperature of 125° C. Upon addition of the initiator solution, the reaction mixture becomes milky in appearance. Following complete addition of the initiator solution, the reaction mixture is heated for an additional 4 hours at 125° C. Following this period, the product is vacuum stripped to remove any volatile impurities. The product is a dispersion containing about 5% of the cholesterol-containing polymer.

C. Molded Foam Prepared from Dispersion of Cholesterol-Containing Polymer

A molded flexible foam is prepared from the following formulation:

| Component | Parts by Weight |
|---|---|
| Cholesterol-Containing Dispersion[1] | 100 |
| Water | 3.8 |
| Silicone Surfactant[2] | 1.65 |
| Tertiary Amine Catalyst[3] | 0.24 |
| Catalyst A[4] | 0.12 |
| Organotin catalyst B[5] | 0.0042 |
| Diethanol amine | 1.7 |
| Toluene diisocyanate[6] | 105 index |

[1]From Example 1-B
[2]Y-10184 silicone surfactant, sold by Union Carbide Corporation
[3]bis(N,N—dimethylaminoethyl)amine
[4]A 33 weight percent solution of triethylenediamine in dipropylene glycol
[5]Dimethyltindilaurate
[6]An 80/20 by weight mixture of the 2,4- and 2,6- isomers The mixture exhibits a rise time of 35 seconds and a cure time of 6 minutes.

The properties of this foam (designated Foam Sample No. 1) are reported in Table 1 following.

EXAMPLE 2

A molded foam is prepared as described in Example 1-C, except the dispersion is replaced with an equal weight of a conventional copolymer polyol containing 10% by weight dispersed styrene/acrylonitrile (70/30 weight ratio) particles. The properties of this foam (designated Comparative Sample No. A) are reported in Table 1 following.

Another molded foam (Sample No. 2) is prepared as described in Example 1-C, except a portion of the liquid crystal dispersion is replaced with a copolymer polyol containing dispersed styrene/acrylonitrile particles (70/30 weight ratio) so that the blended polyols contain 10% by weight dispersed SAN particles and 2.5% by weight dispersed cholesterol-containing polymer. The properties of this foam are described in Table 1.

Molded foam Sample No. 3 is prepared as described in Example 1-C, except a portion of the dispersion is replaced with a copolymer polyol containing dispersed styrene/acrylonitrile particles (70/30) weight ratio) so that the blended polyols contain 10% by weight dispersed SAN particles and 3% by weight dispersed cholesterol-containing polymer. The properties of this foam are described in Table 1.

As can be seen from the data in Table 1, the use of small amounts of the cholesterol-containing polymer provides a substantial increase in modulus.

TABLE 1

| Property | 1 | A* | 2 | 3 |
|---|---|---|---|---|
| % CCP[1] | 5 | 0 | 2.5 | 3.0 |
| % CPP solids[2] | 0 | 10 | 10 | 10 |
| Density, lb/ft[3] | 1.88 | 1.87 | 1.93 | 1.94 |
| Tensile Str, psi | 17.1 | 22.8 | 22.5 | 22.1 |
| Elongation, % | 111 | 107 | 114 | 103 |
| Tear Str, pli[4] | 1.59 | 1.81 | 1.57 | 1.90 |
| Resiliency, %[5] | 55 | 55 | 53 | 48 |
| Compresson Set[6] | | | | |
| Ct | 6.6 | 6.6 | 8.0 | 8.5 |
| Cd | 12.9 | 13.1 | 15.6 | 16.7 |
| ILD[7] | | | | |
| 25% | 18 | 22 | 24 | 24 |
| 65% | 50 | 53 | 65 | 69 |
| ret 25% | 15 | 17 | 20 | 18 |
| Modulus[8] | 2.78 | 2.41 | 2.71 | 2.88 |
| Air flow[9] | 4.3 | 4.8 | 4.6 | 4.4 |

*Not an example of this invention
[1]CCP is cholesterol-containing polymer
[2]% styrene/acrylonitrile particles in the polyol blend
[3]ASTM 3574-81 Test E
[4]ASTM 3574-81 Test F
[5]ASTM 3574-81 Test H
[6]ASTM 3574-81 Test D
[7]ASTM 3574-81 Test B. ILD is indentation load deflection.
[8]Ratio of 65% ILD to 25% ILD.
[9]ASTM 3574-81

EXAMPLE 3

Molded foam Sample No. 4 is prepared according to the general process described in Example 1-C. The polyols used are a blend of a copolymer polyol and a solution of a cholesterol-containing polymer in Polyol A. This blend is substituted on a weight for weight basis for the dispersion used in Example 1-C. The cholesterol-containing polymer is prepared as described in Example 1B, but at a lower molecular weight so it is soluble in Polyol A. The copolymer polyol is prepared according to the general process described in copending application of Hoffman, Ser. No. 812,435, filed Dec. 23, 1985. The copolymer polyol is prepared by capping Polyol A with 0.161 moles of IEM per mole of polyol, and copolymerizing the capped polyol with a small portion of styrene and acrylonitrile to form a stabilizer compound which is soluble in additional polyol. A solution of the capped polyol in an additional amount of Polyol A is then used as the base polyol in which additional styrene and acrylonitrile are polymerized in a 70/30 weight ratio to form a copolymer polyol having 35% solids. In making the foam, the copolymer polyol and polyol solution of the cholesterol-containing polymer are blended at ratios such that the blend has an overall content of dispersed SAN particles of 10% by weight, and contains 3.5% by weight of the cholesterol-containing polymer. The properties of this foam are as indicated in Table 2 following.

For comparison, a molded foam is prepared in like manner, except the sole polyol used is the copolymer polyol described with respect to Sample No. 4, diluted with Polyol A to 10% solids by weight. The properties of this foam (designated Comparative Sample B) are as described in Table 2 following.

TABLE 2

| Property | B* | 4 |
| --- | --- | --- |
| % CCP content[1] | 0 | 3.5 |
| % CPP solids[2] | 10 | 10 |
| Density, lb/ft[2] | 1.91 | 2.01 |
| Tensile Str, psi[3] | 20.3 | 24.3 |
| Elongation, % | 102 | 107 |
| Tear Str, pli[4] | 1.85 | 1.93 |
| Resiliency, %[5] | 55 | 52 |
| Compression Set[6] | | |
| Ct | 6.6 | 7.5 |
| Cd | 12.8 | 14.7 |
| ILD[7] | | |
| 25% | 23 | 25 |
| 65% | 60 | 71 |
| ret 25% | 19 | 20 |
| Modulus[8] | 2.61 | 2.84 |
| Air Flow[9] | 5.6 | 4.2 |

*Not an example of this invention
[1]CCP is cholesterol-containing polymer
[2]wt % styrene/acrylonitrile particles in the polyol mixture
[3]ASTM 3574-81 Test E
[4]ASTM 3574-81 Test F
[5]ASTM 3574-81 Test H
[6]ASTM 3574-81 Test D
[7]ASTM 3574-81 Test B. ILD is indentation load deflection.
[8]Ratio of 65% ILD to 25% ILD.
[9]ASTM 3574-81

Improved modulus, tensile strength, elongation, ILD and resiliency are seen with the use of a cholesterol-containing polymer.

EXAMPLE 4

Molded foam sample No. 5 is prepared in the same manner as Sample No. 4, except it contains only 2.6% by weight of dissolved cholesterol-containing polymer. Its properties are as reported in Table 3 following.

As a further check on the beneficial effects of using a cholesterol-containing polymer which is soluble in the polyol, a parallel experiment is run, substituting a different, non-rigid, soluble addition polymer for the cholsterol-containing polymer. As such polymer is used a preformed stabilizer as described with respect to the preparation of the copolymer polyol in Example 2, except the capping level is only 0.06 moles/mole. This preformed stabilizer is present at a 2.6% by weight level. The properties of this molded foam (designated Comparative Sample C) are as reported in Table 3 following.

For comparison, the properties of Comparative Foam D, made from a copolymer polyol containing 10% solids prepared by polymerizing styrene and acrylonitrile in Polyol A in the presence of the preformed stabilizer used to prepare Comparative Sample C, are reported in Table 3. The data in Table 3 shows that excellent foam having in particular improved modulus, tensile strength and ILD is prepared according to this invention. The use of the soluble, non-rigid polymer does not provide ILD or modulus improvements.

TABLE 3

| Property | C* | D* | 5 |
| --- | --- | --- | --- |
| % CCP[1] | 0 | 0 | 2.6 |
| CPP solids[2] | 0 | 10 | 0 |
| Density, lb/ft[3] | 1.91 | 1.98 | 2.08 |
| Tensile Str, psi | 20.9 | 19.5 | 25.1 |
| Elongation, % | 98 | 91 | 96 |
| Tear Str, pli[4] | 2.12 | 1.95 | 1.40 |
| Resiliency, %[5] | 52 | 53 | 52 |
| Compression Set[6] | | | |
| Ct | 5.9 | 5.0 | 6.0 |
| Cd | 11.6 | 9.7 | 11.8 |
| ILD[7] | | | |
| 25% | 26 | 25 | 25 |
| 65% | 64 | 64 | 71 |
| ret 25% | 20 | 20 | 20 |
| Modulus[8] | 2.46 | 2.56 | 2.84 |
| Air flow[9] | 4.8 | 5.2 | 2.2 |

*Not an example of this invention
[1]CCP is cholesterol-containing polymer
[2]% styrene/acrylonitrile particles in the polyols
[3]ASTM 3574-81 Test E
[4]ASTM 3574-81 Test F
[5]ASTM 3574-81 Test H
[6]ASTM 3574-81 Test D
[7]ASTM 3574-81 Test B. ILD is indentation load deflection.
[8]Ratio of 65% ILD to 25% ILD.
[9]ASTM 3574-81

What is claimed is:

1. A solution or colloidal dispersion of a polymer of an ethylenically unsaturated steroid derivative in an active hydrogen-containing compound having an average of at least two isocyanate-reactive groups per molecule.

2. The solution or colloidal dispersion of claim 1 wherein said ethylenically unsaturated steroid derivative is a derivative of cholesterol, cholestanol, dorisinol, campesterol, β-sitosterol, stigmatserol, ergosterol or cycloartenol.

3. The solution or colloidal dispersion of claim 2 wherein the active hydrogen-containing compound comprises a polyether polyol or amine-terminated polyether having a nominal functionality from about 2 to about 4 and an equivalent weight from about 800 to about 3000.

4. The solution or colloidal dispersion of claim 3 wherein said polymer of an ethylenically unsaturated steroid derivative is soluble in said polyether polyol or amine-terminated polyether.

5. The solution of claim 4 wherein said ethylenically unsaturated steroid derivative is a cholesterol derivative.

6. The solution of claim 5 wherein about 1 to about 10 parts of said polymer of an ethylenically unsaturated steroid derivative are present per 100 parts by weight of active hydrogen-containing compound.

7. The solution or colloidal dispersion of claim 3 wherein said polymer of an ethylenically unsaturated steroid derivative is dispersed in said polyether polyol or amine-terminated polyether.

8. The colloidal dispersion of claim 7 wherein said ethylenically unsaturated steroid derivative is a cholesterol derivative.

9. The colloidal dispersion of claim 8 wherein about 3 to about 60 parts of said polymer of an ethylenically unsaturated steroid derivative are present per 100 parts by weight of active hydrogen-containing compound.

10. The solution or colloidal dispersion of claim 3, further comprising a blowing agent.

11. The solution or colloidal dispersion of claim 10, further comprising a silicone surfactant and an organometallic or tertiary amine catalyst.

12. The solution or colloidal dispersion of claim 2 wherein the active hydrogen-containing compound has a nominal functionality from about 2 to about 16 and an equivalent weight from about 31 to about 1000.

13. The solution or colloidal dispersion of claim 12, further comprising a blowing agent, a silicone surfactant and an organometallic or tertiary amine catalyst.

14. A polyurethane and/or polyurea polymer prepared by reacting the solution or dispersion of claim 1 with a polyisocyanate.

15. A polyurethane and/or polyurea polymer prepared by reacting the solution or dispersion of claim 3 with a polyisocyanate.

16. A polyurethane and/or polyurea polymer prepared by reacting the solution or dispersion of claim 6 with a polyisocyanate.

17. A polyurethane and/or polyurea polymer prepared by reacting the solution or dispersion of claim 9 with a polyisocyanate.

18. A polyurethane and/or polyurea polymer prepared by reacting the solution or dispersion of claim 11 with a polyisocyanate.

19. A polyurethane and/or polyurea polymer prepared by reacting the solution or dispersion of claim 13 with a polyisocyanate.

20. A polyurethane and/or polyurea foam containing a polymer of an ethylenically unsaturated steroid derivative.

21. The foam of claim 20 which is a flexible foam.

22. The foam of claim 21 wherein said polymer is a polymer of an ethylenically unsaturated derivative of cholesterol.

23. A crosslinked, non-cellular or microcellular polyurethane and/or polyurea polymer containing a polymer of an ethylenically unsaturated steroid derivative.

24. The polyurethane and/or polyurea polymer of claim 23 wherein said ethylenically unsaturated steroid is cholesterol.

* * * * *